UNITED STATES PATENT OFFICE.

FREDERICK M. G. JOHNSON, OF MONTREAL, QUEBEC, CANADA.

METHOD OF SEPARATING NITRO COMPOUNDS FROM LIQUIDS.

1,271,578. Specification of Letters Patent. Patented July 9, 1918.

No Drawing. Application filed September 18, 1917. Serial No. 191,996.

*To all whom it may concern:*

Be it known that I, FREDERICK M. G. JOHNSON, a subject of the King of Great Britain, and resident of the city of Montreal, in the Province of Quebec and Dominion of Canada, have invented certain new and useful Improvements in Methods of Separating Nitro Compounds from Liquids, of which the following is a full, clear, and exact description.

This invention relates to a method of separating nitro compounds from liquids, and more especially to a method of separating trinitrotoluol from spent acid.

The object of the invention is to provide means for quickly and economically effecting the desired separation.

At the present time, after the nitration process and the removal of the trinitrotoluol from the apparatus, it is found that the spent acid contains a considerable amount of the trinitrotoluol which has not been removed by the ordinary separation process. This material is in the form of minute crystals in suspension in the acid. The specific density of the crystals is so nearly that of the acid that long standing is necessary before the crystals will rise to the top. The disadvantages of this are obvious.

According to the present invention the spent acid containing in suspension minute particles of trinitrotoluol is placed in a hermetically closed vessel and a vacuum produced above the liquid. Minute bubbles of gas form on and cling to the particles of trinitrotoluol and render the same more buoyant, so that the particles rise to the top of the liquid. This action occurs comparatively quickly, so that in a short time the acid may be drawn off from the lower part of the container, and the remaining sludge which is trinitrotoluol, with a small amount of acid, removed separately and suitably treated for the separation of the small amount of remaining acid. This may be accomplished by heating the mixture sufficienly to melt the trinitrotoluol and cause the same to float on the top of the acid, so that it may be skimmed or run off.

In order that a more complete understanding of the invention may be obtained, the following concrete example is given, but it must be understood that the invention is not limited to the details specified therein. Example: 1000 lbs. of spent acid is introduced into a vessel which is hermetically sealed, and a vacuum of 25 inches of mercury created in the vessel above the material. Immediately minute bubbles of gas commence to collect on the particles of trinitrotoluol suspended in the acid; these bubbles are presumably oxids of nitrogen which were prevented from formation by atmospheric pressure, but which readily form at the reduced pressure. Following the laws of adhesion these bubbles of gas cling to the particles of trinitrotoluol and render the particles more buoyant so that they rise to the surface of the acid. It will be understood that the particles of trinitrotoluol do not become inherently buoyant, but are floated to the surface by the gas bubbles which cling to them. At the end of half an hour the action is complete and substantially the entire amount of suspended trinitrotoluol in the mixture will be found as a layer of thin sludge floating at the surface of the acid. The acid is now drawn off from the bottom of the vessel, and the sludge transferred to another vessel and heated sufficiently to melt the trinitrotoluol and cause the same to separate completely from the small amount of admixed acid.

The action which takes place may be better understood from the following. Assuming the distribution of trinitrotoluol particles in the acid to be one per cubic inch throughout a body of 1000 cubic inches; when the vacuum treatment is applied the particles are floated to the top of the liquid and the distribution becomes 1000 particles in one cubic inch, which cubic inch is spread out in a thin layer over the surface of the liquid with the particles packed as closely together as they will float. Something more than 999 cubic inches of acid may now be drawn off, leaving the 1000 particles of trinitrotoluol mixed with something less than one cubic inch of acid.

It is obvious that the greater the vacuum the more rapid will be the separation, unless for any cause full liberation of gas at atmospheric pressures has not occurred. If this latter is the case, a high vacuum may cause such a rapid evolution of gas that the bubbles will separate from the trinitrotoluol particles and will not float the same to the top; therefore a low vacuum would be required. For this reason no particular degree of vacuum is claimed in order that the invention may not have limitations imposed thereon which will render it inoperative under certain conditions. For the same reason no time limit for the action is fixed. The advantages of the invention are manifest, but may be briefly enumerated as follows:—

1. A saving of time and expense incident to apparatus for storing a large amount of acid during separation process by long standing.

2. A saving in the amount of acid required.

3. The reclamation of acid in a thoroughly cleaned condition.

4. A saving of a considerable amount of trinitrotoluol which would be lost even when using a process of separation by long standing.

5. A considerable saving of acid otherwise lost in separation.

6. A saving of time and expense incident to apparatus for filtration.

Having thus described my invention, what I claim is:—

1. A process of separating trinitrotoluol from spent acid, which consists in floating the trinitrotoluol particles to the surface of the acid by reducing the pressure above the liquid.

2. A method of separating trinitrotoluol from spent acid, which consists in facilitating the formation of gas on the surface of the trinitrotoluol particles whereby the same will be floated to the surface of the acid.

3. A method of separating trinitrotoluol from spent acid, which consists in confining the acid at pressures below atmospheric, and drawing off the acid when the trinitrotoluol has separated therefrom.

4. A method of separating trinitrotoluol from spent acid, which consists in confining the acid at pressures below atmospheric for a period of time sufficient for gas to accumulate on the surface of the trinitrotoluol particles and float same to the surface of the acid, and drawing off the acid after such flotation is effected.

5. A method of separating trinitrotoluol from spent acid, which consists in confining the acid at pressures below atmospheric until such time as the trinitrotoluol particles are floated to the surface thereof by accumulation of gas on the particles, drawing off the cleared acid from beneath the floating mass, and finally subjecting the mass to heat sufficient to melt the trinitrotoluol and cause complete separation thereof from the remaining acid.

6. A process of separating nitro-compounds from spent acid, which consists in floating the nitro particles to the surface of the acid by reducing the pressure above the liquid.

In witness whereof I have hereunto set my hand.

FREDERICK M. G. JOHNSON.

Copies of this patent may be obtained for five cents each, by addressing the "Commissioner of Patents, Washington, D. C."